April 18, 1933.    T. J. FEGLEY ET AL    1,904,679
PUSH DRILL
Filed Jan. 14, 1932
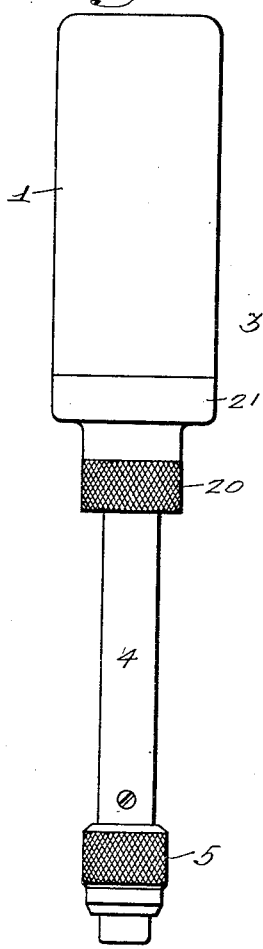
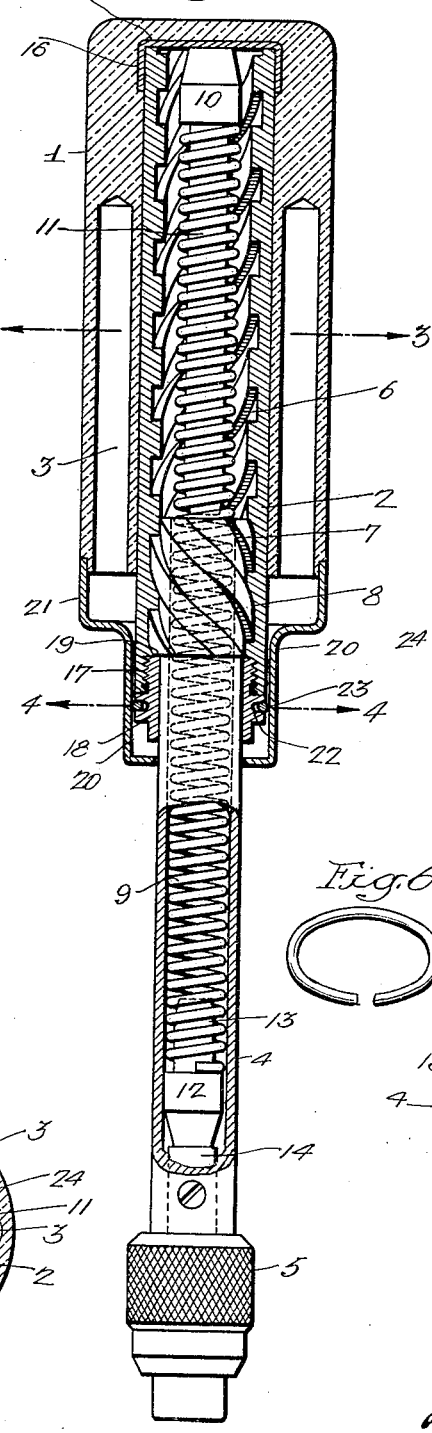
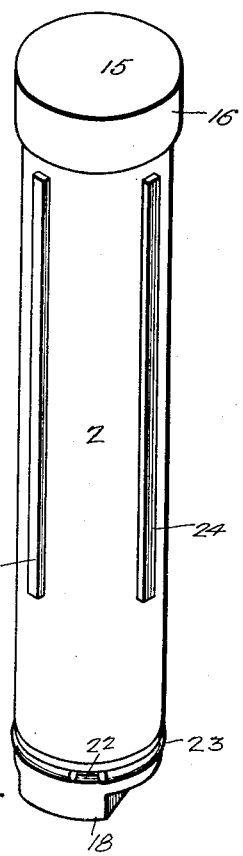
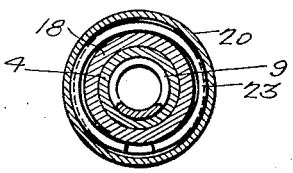
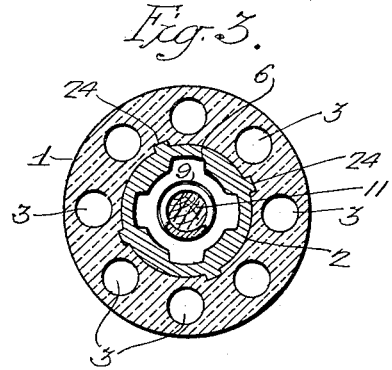
Inventors:
Thomas J. Fegley
George O. Leopold
by their Attorneys
Howson & Howson Patented Apr. 18, 1933

1,904,679

UNITED STATES PATENT OFFICE

THOMAS J. FEGLEY AND GEORGE O. LEOPOLD, OF PHILADELPHIA, PENNSYLVANIA, ASSIGNORS TO NORTH BRO'S M'F'G CO., OF PHILADELPHIA, PENNSYLVANIA, A CORPORATION OF PENNSYLVANIA

PUSH DRILL

Application filed January 14, 1932. Serial No. 586,654.

One object of our invention is to make a comparatively short push drill which will take up little space in the tool kit and which can be readily carried in a pocket.

A further object of the invention is to simplify the construction of the mechanism of the drill.

In the accompanying drawing:

Fig. 1 is a side view of our improved push drill;

Fig. 2 is a longitudinal sectional view;

Fig. 3 is a transverse sectional view on the line 3—3, Fig. 2;

Fig. 4 is a transverse sectional view on the line 4—4, Fig. 2;

Fig. 5 is a detached perspective view of the threaded barrel for imparting a reciprocating motion to the drill spindle; and Fig. 6 is a detached perspective view of the friction ring for holding the cap to the barrel.

1 is the handle of our improved drill, preferably made of a composition which is molded on the barrel 2. In the handle are a series of longitudinal pockets 3 for drill bits of different sizes, which can be secured to the spindle 4 by a chuck 5. The chuck forms no part of this invention as any suitable chuck can be used.

The barrel 2 has an internal screw thread 6 extending substantially its full length. On the inner end of the spindle 4 is an enlargement 7 on which are formed short screw threads 8, which mesh with the internal threads of the barrel 2. The spindle is made hollow as shown in Fig. 2, and a long coil spring 9 is located in the hollow spindle as well as in the barrel 2. The upper end of the spring bears against a head 10 having a long stem 11 which enters the spring, and the other end of the spring bears against a head 12 having a short stem 13 extending into the spring.

The head 12 rests against the end of the spindle 14 of the chuck 5, while the head 10 rests against a cap 15 which is flanged at 16, the cap being forced onto the upper end of the barrel. By this construction pressure applied to the handle 1 will compress the spring and will cause the spindle to enter the barrel and rotate therein and when pressure is relieved the spring will expand and project the spindle and also reverse the rotary movement of the spindle.

The outer end of the barrel has an internal thread 17 and a sleeve 18 having a threaded periphery extends into the barrel, the threads of which mesh with the threads 17 of the barrel. The sleeve snugly fits the body portion of the spindle. The threaded portion 7 being enlarged, it forms a shoulder 19, and when the spindle is projected this shoulder comes in contact with the sleeve 18 and prevents further outward movement of the spindle.

20 is an enclosing cap, which is enlarged at 21 and fits over the reduced portion of the handle 1 and forms a means of retaining the drill bits in the pockets 3. The narrow portion of the cap snugly fits the end of the barrel and encloses the sleeve 18. In order to frictionally retain the cap in position without the use of a nut or other means, an annular groove 22 is formed in the sleeve, in which is a spring ring 23. This spring ring bears frictionally against the cap and holds it in position but with force the cap can be withdrawn from the handle so as to expose the drill bits, any one of which can be readily removed from its pocket and placed in the chuck.

The barrel 2 is a die casting in the present instance, and long ribs 24 are formed on the outside of the barrel as shown in Fig. 5 and the cap 15 is forced over the inner end of the barrel. The barrel is then inserted in a mold in which the handle is cast. The handle is preferably made of any form of heat hardened synthetic resins. The cap 15 prevents the material of the handle entering the interior of the barrel.

We claim:

1. The combination of a handle; a barrel secured to the handle and substantially the full length of the handle, said barrel having an extended internal screw thread, said barrel projecting at its outer end beyond the handle; a hollow spindle having a short enlargement at its inner end; threads on the said enlargement meshing with the threads of the spindle; a long spring in the spindle and in the barrel for projecting the spindle; a sleeve screwed into the outer end of the barrel, acting as a stop to limit the outward movement of the spindle; an annular groove in the sleeve; a cap extending over the end of the spindle and bearing against the handle; and a spring ring mounted in the groove of the sleeve for frictionally holding the cap in its closed position.

2. The combination in a push drill, of a handle made of heat hardened synthetic resin and having longitudinal pockets therein for drill bits; and a barrel having internal screw threads and having ribs on its outer face and having a cap closing its inner end, the said handle being cast around the barrel.

THOMAS J. FEGLEY.
GEORGE O. LEOPOLD.